March 28, 1967 H. BERG 3,311,730
CHATTER-FREE CONTACT DEVICE
Filed Aug. 30, 1965
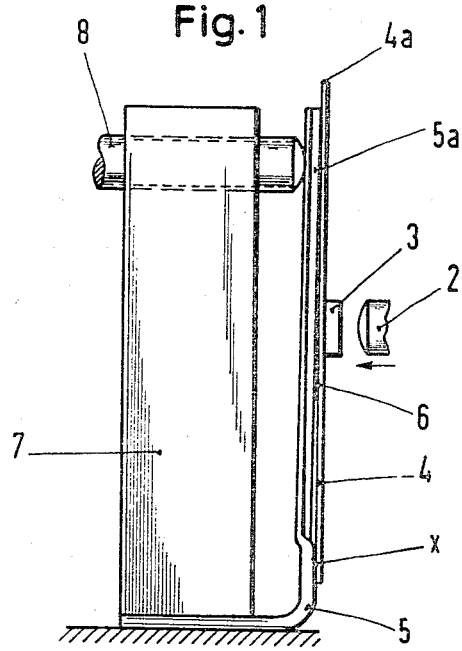
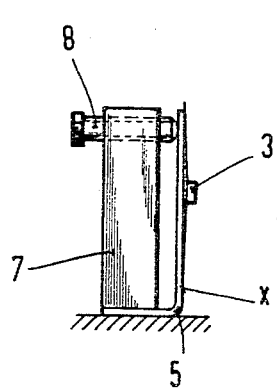
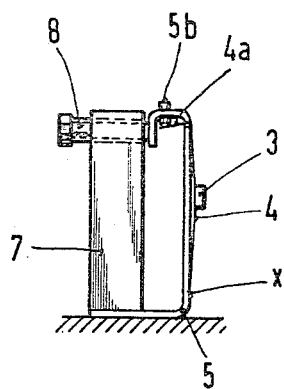
INVENTOR
Herbert Berg
BY *Hice & Hice*
ATTYS.

3,311,730
CHATTER-FREE CONTACT DEVICE
Herbert Berg, Planegg, Germany, assignor to Siemens &
 Halske Aktiengesellschaft, Berlin and Munich, a corporation of Germany
Filed Aug. 30, 1963, Ser. No. 483,589
Filed Aug. 30, 1965, Ser. No. 483,589
§ 92,850
9 Claims. (Cl. 200—166)

The invention relates to a chatter-free contact device, especially for relays having high switching speed, consisting of a movable contact element and at least one stationary contact element.

It is a known practice for the prevention of chattering occurring at the impact points in contact devices, to provide friction spring systems, in order to convert the kinetic energy liberated in the striking of the contact elements, and leading to contact vibrations, through friction into heat. Mechanical friction spring systems have, however, the drawback that the frictional relations of the contact device are subject to operative changes, especially as a result of wear on the friction spring parts.

Continuous sliding of the surfaces rubbing upon each other results in a fine metallic abrasion, which is deposited on the sliding surfaces and the surrounding parts. Moreover, in known contact devices, there are formed on the friction surfaces, grooves and raised parts which may get hooked into each other, so that in many cases considerable frictional work has to be expended in order to make possible any sliding of the friction surfaces. The mechanical abrasion of the friction surfaces is further advanced by the fact that the frictional surfaces oxidize under the influence of the frictional heat. These known phenomena lead to the result that mechanical friction spring systems are subject to such great changes through wear that a chatter-free contact operation is not always assured over any relatively long period of time.

Attempts have heretofore been made to produce constant frictional relations in contact devices by the method of providing a viscous fluid or paste on the surfaces sliding on each other, whereby more constant frictional values result. Thus, to advantage, pastes so utilized have had a vaseline-like nature. Damping there arises through the fact that internal frictional forces occur in the thin paste film disposed on the surfaces sliding upon one another, and, in addition, shearing forces are active which occur in the tearing off of the paste composition lying in any depressions. Despite these measures, even here it is not fully possible to avoid the formation of a metallic abrasion which changes the properties of the lubricant, whereby the chatter-preventing effect is limited in time.

In known contact devices, such as are common in polarized relays with a movable contact element and two stationary contact elements, the frictional spring system is connected with the movable contact elements. Such system thus is disposed on the armature of the relay controlled by the exciting flux, whereby the armature mass and thereby the armature moment of inertia is increased. However, in relays which are to be operated at especially high switching speeds, efforts must be made to keep the armature mass as small as possible. Attempts have therefore already been made to provide the stationary contact elements, which in conjunction with the movable contact element form the electric switch-over device, with corresponding frictional spring systems. However, still other drawbacks result, which manifest themselves, above all, through the fact that on the two stationary contact elements different frictional values are active and thereby different actuation times result. If such poled relays are utilized for telegraphy purposes, a lack of symmetry exists between the signal side and the spacing side, which manifests itself through a change of the response excitation or a distortion of the transmitted signals.

The drawbacks described are avoided in a contact device of the type here involved, through an arrangement that for the dissipation of the impact energy of the movable contact element, controlled preferably by means of an armature, there is allocated to the stationary contact element a damping device consisting of a thin contact spring and a stiff supporting spring, and that between the contact spring and the supporting spring there is present a hollow space filled with air or liquid, in which system the displacement of the filling agent produces a damping effect for the prevention of contact chattering.

In a preferred form of the invention, there is disposed in the hollow space between the springs, a liquid layer in the form of a synthetic lubricant, preferably a lubricant known under the trade name of Synt-A-Lube. While in this case, through the contact movement, the liquid layer introduced between the springs has a damping effect resulting from its displacement, even only a displacement of an air layer can produce a damping action.

With the use of a liquid damping material the small oscillation amplitudes of the contact springs are translated into large amplitudes of a liquid column, in which process the displacement of the liquid particles thereby resulting exerts a chatter-preventing influence on the moved parts of the contact device. The introduction of such a liquid layer into the hollow space between the contact spring and the supporting spring takes place in practice through the application of a drop of liquid which then, through capillary action is distributed between the springs. To insure that in the shifting of the liquid particles no liquid emerges on the sides of the springs and thereby becomes lost, expediently the supporting spring may be provided with longitudinally extending beveled edges. Moreover, a liquid escaping somewhat to the sides, following the damping action is, through adhesion, always again returned between the springs.

The problem of the producing of a hollow space between the contact spring and the supporting spring can be solved by various forms of construction. In the simplest case, the contact spring is provided with a plane surface and is secured to an offset supporting spring. It is also possible, however, for the supporting spring to have a plane surface and the contact spring attached thereto to be curved. In both cases, the free end of the contact spring rests against the upper end of the supporting spring.

Since it is difficult, in the last-mentioned case to produce the slight curvature of the contact springs with the necessary uniformity, the upper end of the contact spring can be constructed as a bent-over angle piece which is adjustable by means of a screw mounted in the upper part of the supporting spring. Such screw, which is located in the bent-over portion of the supporting spring, bears against the bent-over end of the contact spring and may be adjusted to provide an optimal freedom from chatter in dependence upon the particular operating conditions. Moreover, the rest position of the supporting spring and thereby of the stationary contact element may be varied through an adjusting screw located in a carrier piece, without altering the adjusted contact spring curvature.

Further details of the invention will appear from the following description of three embodiments thereof. In the drawing wherein like reference characters indicate like or corresponding parts:

FIG. 1 is an enlarged side elevational view of a contact device according to the invention;

FIG. 2 illustrates a modification of the construction of FIG. 1, in which a supporting spring, having a plane surface, is cooperable with a slightly curved contact spring; and FIG. 3 illustrates a solution comparable with the device according to FIG. 2 but providing an adjustment of the curvature of the contact spring.

The contact device shown in FIG. 1 is especially suitable for use with liquid damping means and, for the better perception of the details is represented on a large scale in comparison to the actual size contact devices according to FIGS. 2 and 3. The contact device consists of a relatively thin straight contact spring 4, which carries contact element 3, soldered or welded thereon. The lower end of the contact spring 4 is welded at point $x$ to a relatively stiff supporting spring 5, on which its upper end 4a rests. The contact spring 5 is somewhat offset at a point above the welding location, so that between this and the contact spring 4 a narrow wedge-shaped gap is formed. For the achievement of a sufficient damping surface, the width of the two springs is relatively large and therefore through corresponding dimensioning of these surfaces the damping effect can be established. In operation of the contact, through the liquid layer 6, disposed between the contact spring 4 and the supporting spring 5, in consequence of the displacement and resulting internal friction, a damping of the moved parts of the contact device is achieved thereby.

The liquid column between the springs, which is disposed largely at the upper end of the two springs amounts to about 60 to 70% of the total contact spring length. In the impact of the movable contact element 2, which is removable (for example in the direction of the arrow) by an armature (not shown) on the stationary contact element 3, the small vibration amplitudes of the contact springs 4 are translated into large amplitudes of the liquid layer 6 and in this way the displacements of the liquid particles produce a damping of the chatter vibrations. To prevent the escape of liquid at the sides of the springs in the process, the longitudinally extending edges of the supporting spring 5 are provided with bevels 5a adjacent the spring 4. The rest position of the supporting spring 5 and thereby of the stationary contact element 3 is adjustable by a screw 8 which may be mounted in a carrier 7.

FIG. 2 also illustrates a contact device of this type which is particularly suitable for the use of an air damping. On the straight supporting spring 5 there is welded a thin, slightly arched contact spring 4, the upper end of which likewise rests on the supporting spring 5 and may be adjusted in its position by the screw 8. Since it is difficult from a manufacturing standpoint to uniformly produce a predetermined curvature, a device may be employed for effecting adjustment of the contact spring 4, such as illustrated in FIG. 3.

With respect to the curvature of the contact spring 4 there here exists substantial correspondence with the solution according to FIG. 2, but in this case the curvature of the contact spring 4 is variable by means of an adjusting screw 5b. The supporting spring 5 is here narrowed at the upper end to about half its width and such narrow end is twice bent over. The upper end of the contact spring 4 contacting the supporting spring 5 is provided with a rectangular recess through which the narrow part of the supporting spring protrudes. At this point the contact spring 4 is bent at a right angle over the shoulders formed by offsets in the supporting spring 5. The screw 5b, mounted in the bent-over part of the supporting spring 5, bears against the bent-over end 4a of the contact spring 4, whereby the curvature of the contact spring 4 can be adjusted within a relatively great range. In this manner it is possible to adapt the contact device to desired operating conditions or to bring the freedom from chatter of the contact device to optimal values.

Instead of an air damping it also is possible to use a liquid damping in the manner shown in FIG. 1 in the embodiment illustrated in FIGS. 2 and 3. Moreover, the contact device according to the invention with liquid or air damping is not limited to use in relays. Such contact devices, for example, can be successfully used wherever an especially chatter-free operating behavior is desired, in like manner for switching systems which are mechanically, pneumatically, hydraulically or magnetically controllable.

Changes may be made within the scope and spirit of the appended claims which define what is believed to be new and desired to have protected by Letters Patent.

I claim:

1. A chatter-free contact device, especially for relays having high switching speed, and having a movable contact element and at least one stationary contact element, characterized in that for the dissipation of the impact energy of the movable contact element, preferably controlled by means of an armature, there is allocated to the stationary contact element a damping device comprising a thin contact spring and a stiff supporting spring, said contact spring and supporting spring arranged to form a hollow space therebetween, in which is present a fluid, said fluid, upon movement of the contact spring toward the supporting spring, displaced to effect a damping action for the prevention of contact chatter.

2. A contact device according to claim 1, wherein said fluid is air.

3. A contact device according to claim 1, wherein said fluid comprises a liquid layer in the form of a synthetic lubricant.

4. A contact device according to claim 1, wherein the contact spring has a plane surface and is attached on one side to an offset portion of the supporting spring.

5. A contact device according to claim 4, wherein the supporting spring carries the contact spring through a welded connection.

6. A contact device according to claim 1, wherein the supporting spring has longitudinally extending beveled edges adjacent the contact spring.

7. A contact device according to claim 1, wherein the contact spring attached to the supporting spring is arched, while the supporting spring has a planar adjacent face.

8. A contact device according to claim 7, wherein the upper end of the contact spring is constructed as a bent-over angle portion which is adjustable with respect to the curvature of the contact spring by means of a screw mounted in the upper part of the supporting spring.

9. A contact device according to claim 1, wherein the rest position of the supporting spring and thereby of the stationary contact element is variable by means of an adjusting screw supported in a carrier.

References Cited by the Examiner

UNITED STATES PATENTS

| | | | |
|---|---|---|---|
| 2,406,036 | 8/1946 | Pollard | 200—166 |
| 2,722,584 | 11/1955 | Skay | 200—19 |
| 2,903,536 | 9/1959 | McBrian | 200—166 X |

ROBERT K. SCHAEFER, *Primary Examiner.*

H. O. JONES, *Assistant Examiner.*